United States Patent [19]
Tanaka et al.

[11] Patent Number: 5,567,062
[45] Date of Patent: Oct. 22, 1996

[54] PRINTING MACHINE HAVING A MENU WITH MODE SELECTION

[75] Inventors: Yoshiaki Tanaka, Sakai; Masashi Tanimoto, Yamatokoriyama, both of Japan

[73] Assignee: Sharp Kabushiki Kaisha, Osaka, Japan

[21] Appl. No.: 431,766

[22] Filed: May 1, 1995

[30] Foreign Application Priority Data

May 16, 1994 [JP] Japan .................................. 6-100477

[51] Int. Cl.⁶ ........................................... B41J 5/30
[52] U.S. Cl. .................. 400/62; 400/73; 400/76
[58] Field of Search .................. 400/61, 62, 70, 400/73, 76

[56] References Cited

U.S. PATENT DOCUMENTS 4,970,554  11/1990  Rourke .................................. 400/76
4,990,005  2/1991  Karakawa ............................. 400/76
5,076,718  12/1991  Sugino .................................. 400/76
5,085,529  2/1992  McGourty ............................ 400/76

FOREIGN PATENT DOCUMENTS 2026777  1/1990  Japan .

Primary Examiner—John S. Hilten
Attorney, Agent, or Firm—David G. Conlin; Milton Oliver

[57] ABSTRACT

The present invention provides a printing apparatus equipped with inexpensive, scaled-down, lightweight recognition and setting functions. The printing apparatus is capable of setting desired modes of printing, adjustment, etc. by referring to a mode selection menu sheet, in which setting items, mode options for each setting item, and a plurality of marks specifying a mode are listed. A desired mode for each setting item may be set by operating selection keys in correspondence to the marks specifying the desired mode.

3 Claims, 7 Drawing Sheets

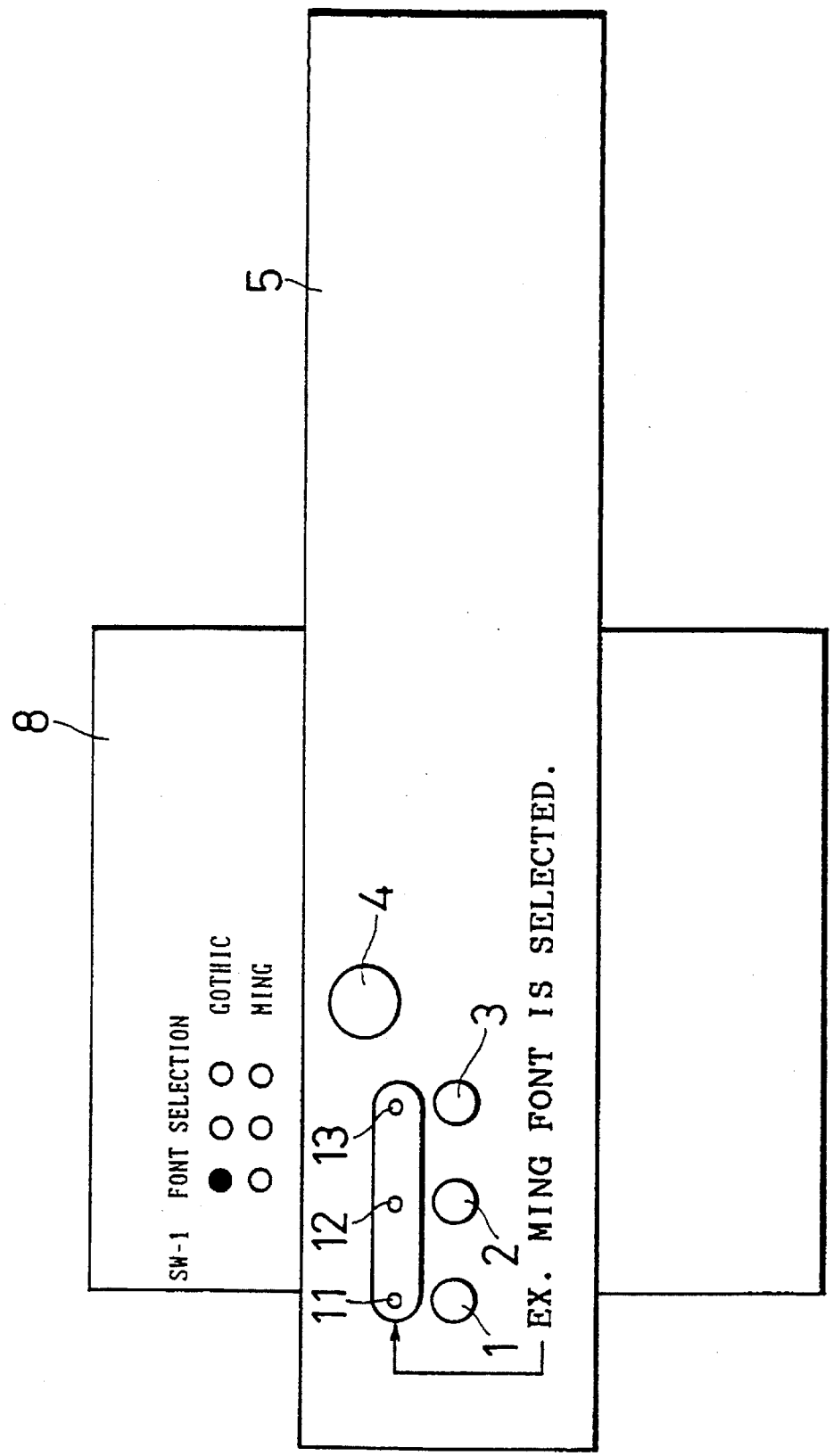

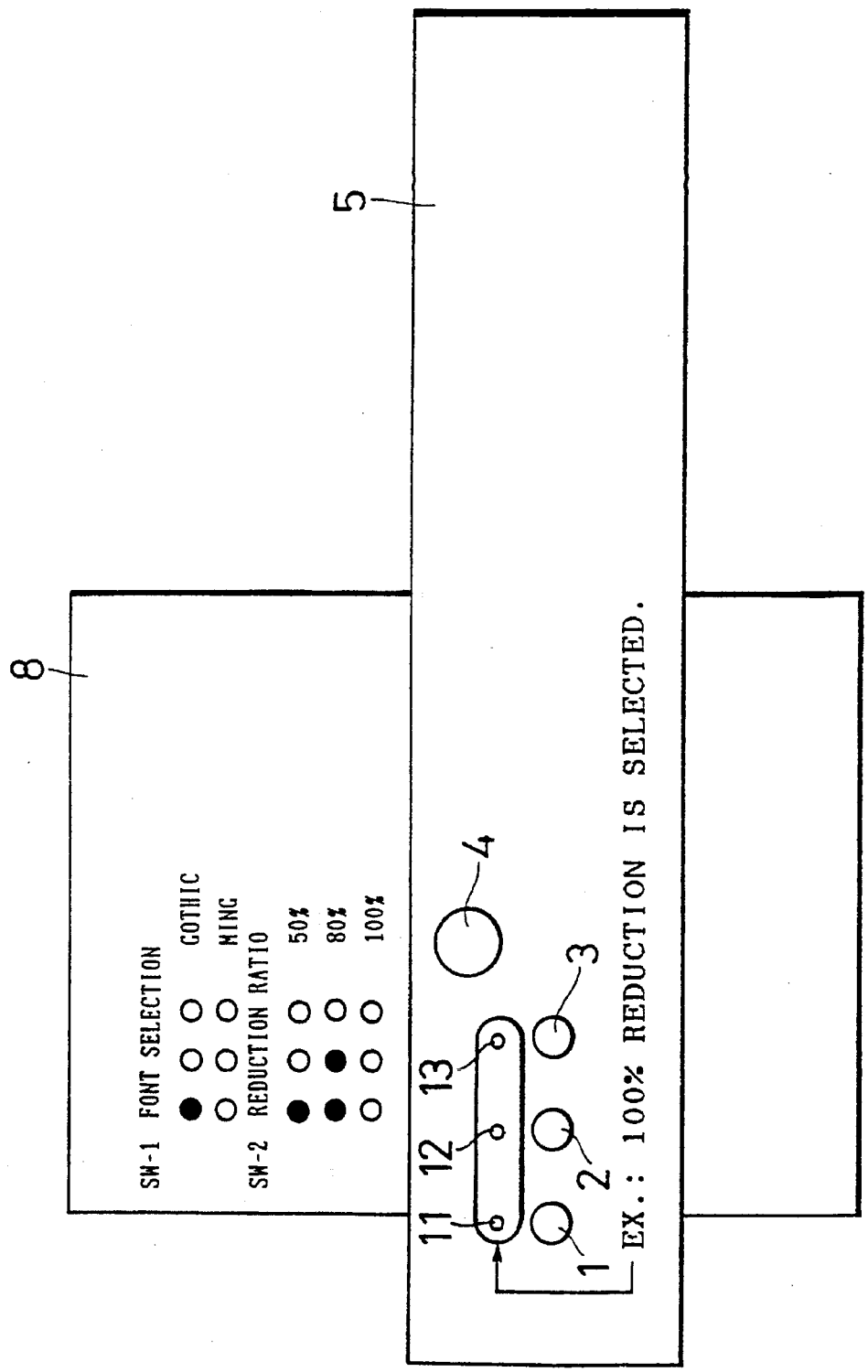

PRINTING MACHINE HAVING A MENU WITH MODE SELECTION

BACKGROUND OF THE INVENTION

1. Field of the Invention

The present invention relates to a printing apparatus which allows to se desired modes for printing, adjustment, etc. using a mode election menu sheet.

2. Description of the Related Art

In printing aparatuses such as printers, setting the modes regarding fonts, printing sizes (e.g., enlarged, reduced), sheet folding etc. is usually required prior to printing as desired.

Such setting conventionally involves the use of a display such as a liquid crystal display which presents the current modes which may be identified and changed by an operator with a switch in order to set different modes for desired printing.

Another way of setting of modes is presented in Japanese Unexamined Patent Publication JPA 2-26777(1990) which discloses a printing apparatus in which a printing carriage is moved to an area for showing printing modes (e.g., bold faced, underlined), located in the vicinity of a printing position determining scale. A desired printing mode is specified with an indicator in the printing carriage and the specified printing mode is established by operating keys.

The aforementioned conventional way of setting of modes requires a display such as a liquid crystal display for identifying the established modes, and as a result that presents the printing apparatus with many problems including increase in size, weight and cost.

The way of sitting of modes which is described in Japanese Unexamined Patent Publication JPA 2-26777 (1990) has apparatus-size-dependent limits in the number of mode categories (herein after described as setting items) which may be displayed in a printing mode showing area and thus there occurs a problem such that setting items to be displayed can not entirely be presented at one displaying.

SUMMARY OF THE INVENTION

It is hence an object of the present invention to provide a printing apparatus with a simple structure which allows easy setting of modes for the greatest possible number of setting items.

The present invention provides a printing apparatus comprising:

a mode selection menu sheet to be referred to in setting a desired mode regarding printing, adjustment, etc., on which are successively listed, in the direction of feeding of a sheet, a plurality of groups including a setting item, mode options and a plurality of marks for specifying a mode option;

sheet feeding means for feeding the mode selection menu sheet in such a manner which allows successive viewing of the plurality of setting item groups listed on the sheet;

selection keys provided to match the number of the marks for specifying a mode option;

lamp means provided to correspond to the selection keys;

display control means for indicating an established mode for each setting item for the printing apparatus with the ON/OFF state of the lamp means, sequentially as the mode selection menu sheet proceeds; and mode-setting beans for changing the ON/OFF state by operation of the selection keys to change the established mode for the printing apparatus in response to the operation of changing the ON/OFF state, wherein the selection keys may be operated with reference to the made specifying marks listed on the mode selection menu sheet to set desired modes of the respective setting items.

Further, according to the present invention, the mode setting means comprises an ENTER key for entering the mode selected by the selection keys, and means for recognizing the mode established by the operation of the ENTER key, on the basis of the distance traveled by the mode selection menu sheet and the states of the selection keys, and the sheet-feeding means comprises feeding means for feeding the mode selection menu sheet by one group including a setting item, mode options and a plurality of marks for specifying a mode option each time the ENTER key is operated.

According to the present invention, the mode selection menu sheet is fed upon its insertion into the sheet feeding means of a printing apparatus, and the movement of the sheet is suspended at a prescribed position. At this point in time, the lamp means represents the mode option preset for the printing apparatus, regarding the setting item listed on the part of the more selection menu sheet, which has been fed for viewing as a reference by the last feeding. The operator identifies the current mode by comparison between the ON/OFF states of the lamp means and the mode specifying marks, and operates the selection keys to establish the mode as desired with reference to a row of marks specifying the desired mode. The printing apparatus may be set in this way to change the modes into desired ones.

Further, according to the present invention, upon operating the ENTER key the present mode setting may be established, while the mode selection menu sheet is moved to a position at which the operator may view the next group including a setting item, mode options, and a plurality of marks listed on the mode selection menu sheet, and the printing apparatus is automatically ready for setting a mode for the next setting item.

As mentioned above, according to the invention, since the last established mode is indicated by the lamp means upon insertion of the mode selection menu sheet, the current mode may be checked by comparison between the ON/OFF states of the lamp means and the mode specifying marks listed on the sheet.

Furthermore, tin order to update the preset mode into a desired one, the state of the selection keys may be rearranged to match the state of the marks specifying the desired mode. This eliminates the necessity for mounting an extremely expensive display therefore resulting in great reduction in size and production cost of a printing apparatus.

In addition, the number of mode options may be increased with ease and inexpensively by merely lengthening the mode selection menu sheet.

Still further, according to the invention, the ENTER key may be operated to establish the updated mode, while the mode selection menu sheet is moved to a position at which the operator may View the next group including a setting item, mode options, and a plurality of marks listed on the mode selection menu sheet, and the printing apparatus is automatically ready for setting a mode for the next setting item. Thus, the mode for each setting item is successively selected and established speedy.

BRIEF DESCRIPTION OF THE DRAWINGS

Other and further objects, features, and advantages of the invention will be more explicit from the following detailed

Figure 1:
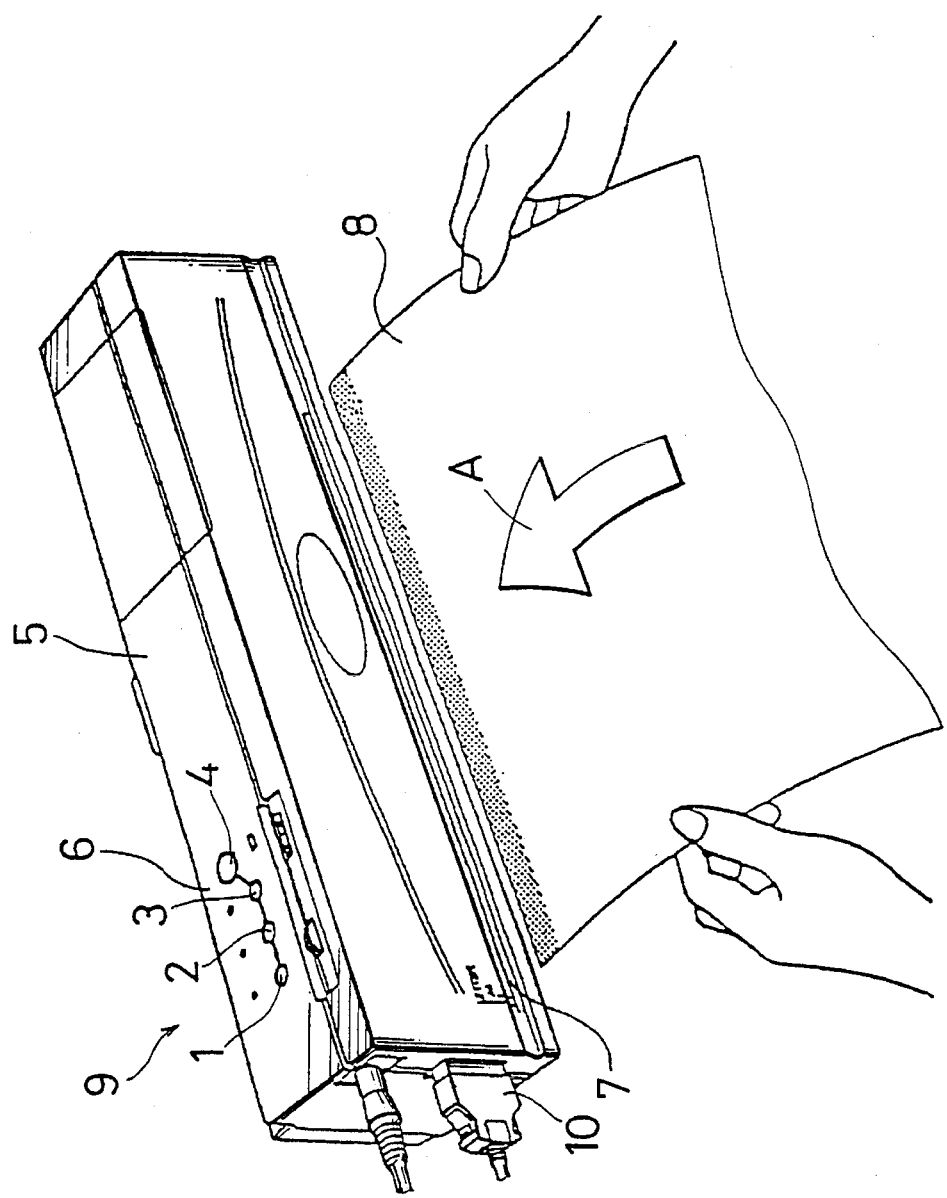
Figure 2:
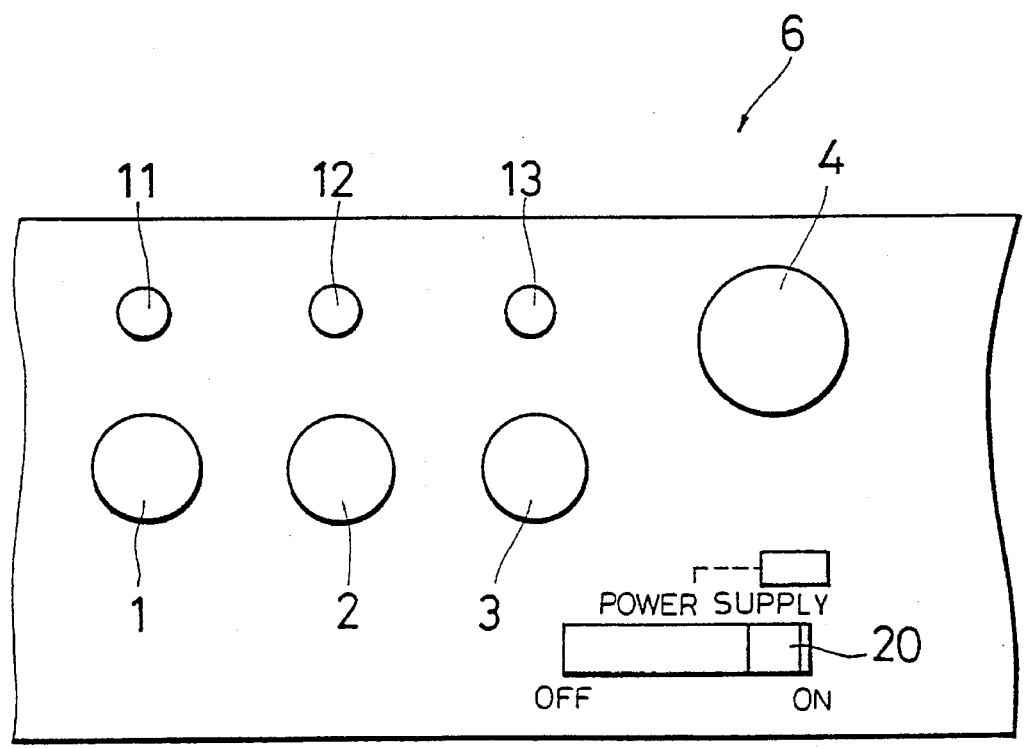
Figure 3:
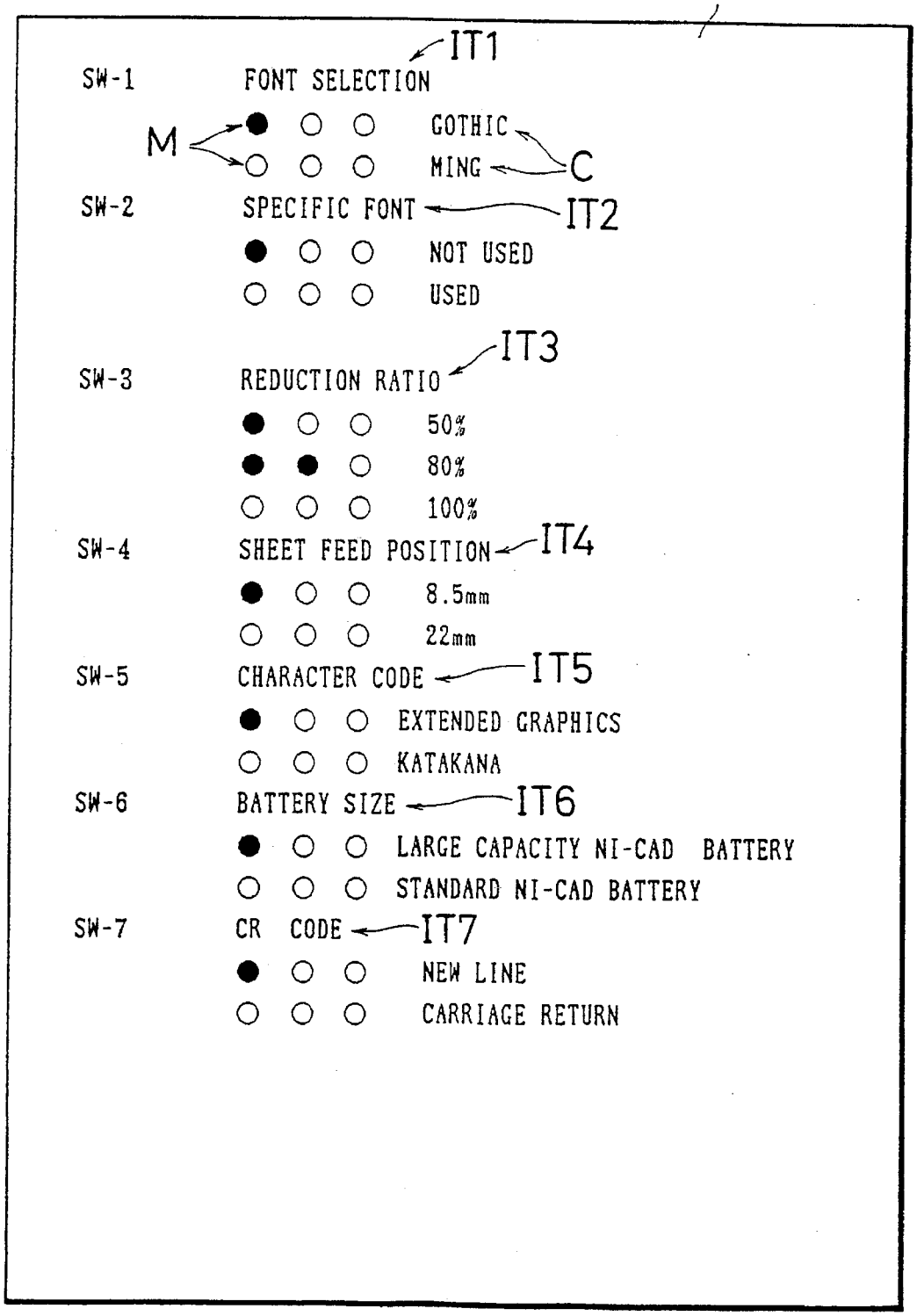
Figure 4:
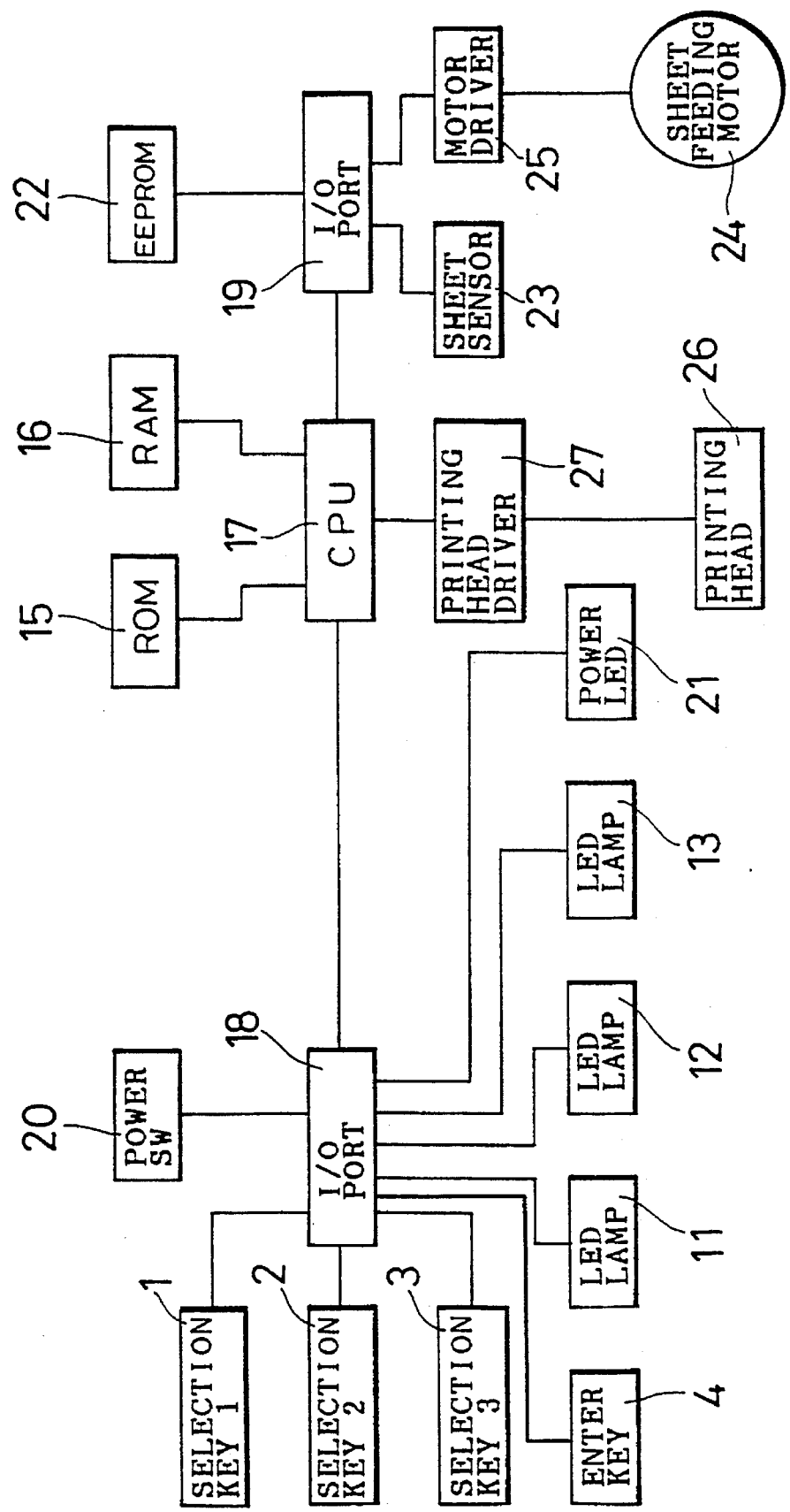
Figure 5:
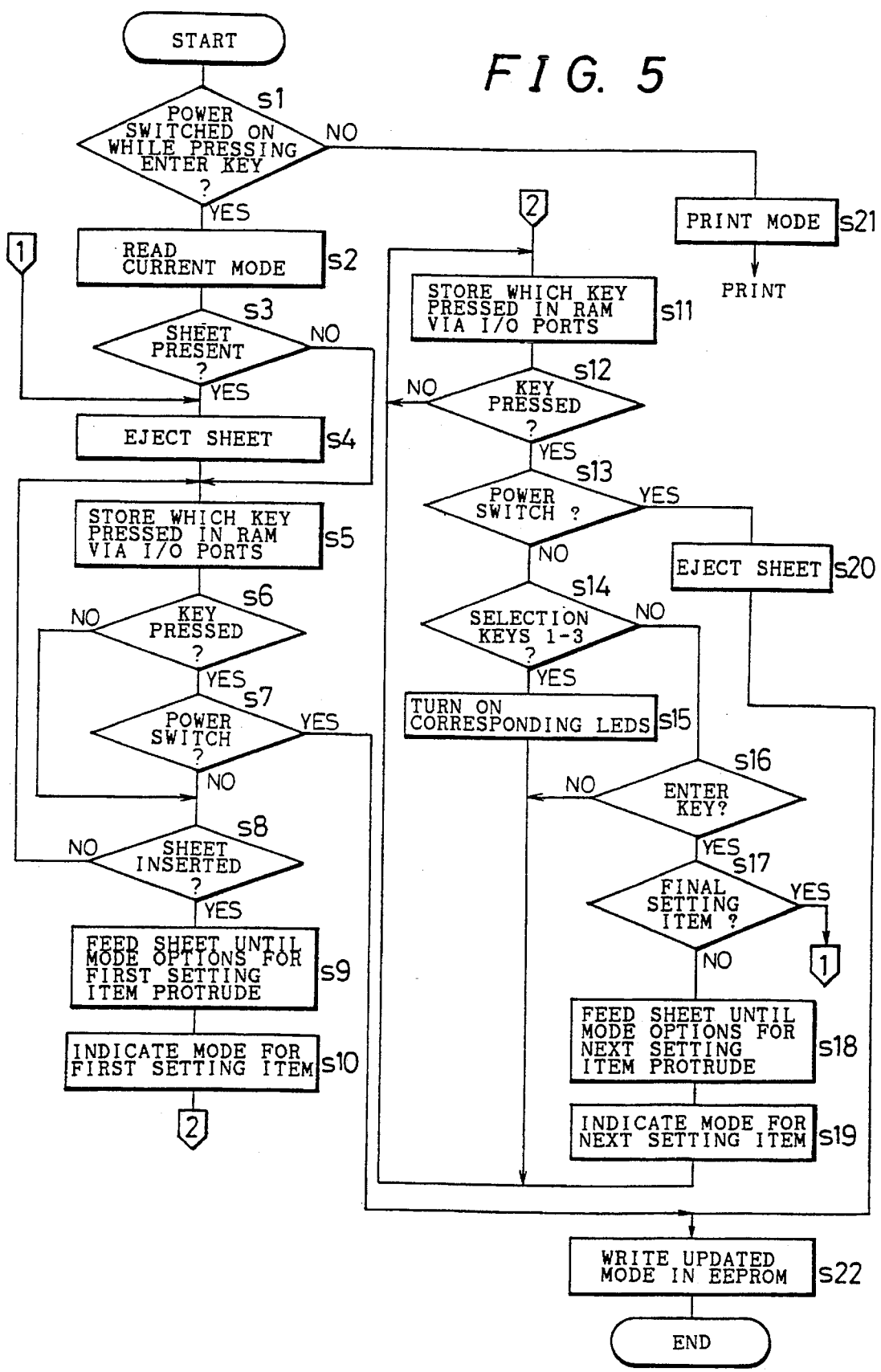

3 description taken with reference to the drawings wherein:

FIG. 1 is a view which illustrates how a mode selection menu sheet is inserted into a printing apparatus 9 according to the invention;

FIG. 2 is an enlarged view of the operation panel section 6 of the printing apparatus 9 of FIG. 1;

FIG. 3 is a plan view which shows an embodiment of a mode selection menu sheet 8 according to the invention;

FIG. 4 is a control block circuit diagram of the printing apparatus 9 according to the present invention;

FIG. 5 is a flow chart which provides a description of operation of the Printing apparatus 9 according to the invention;

FIG. 6 is a schematic illustration which shows the state of the mode selection menu sheet 8 inserted in the printing apparatus 9 according to the invention; and FIG. 7 is an illustration which shows the state of the mode selection menu sheet 8 at the time of setting a mode for the first setting item for the printing apparatus 9 according to the invention.

DETAILED DESCRIPTION OF THE PREFERRED EMBODIMENTS

Now referring to the drawings, preferred embodiments of the invention are described below.

Preferred embodiments of the present invention will now be explained in detail with reference to the accompanying drawings.

FIG. 1 is a perspective view which shows the overall appearance of an embodiment of a printing apparatus 9 according to the invention.

An arrow A in. FIG. 1 illustrates the direction of insertion of a printing paper sheet and a mode selection menu sheet 8 for setting printing and adjustment modes.

In FIG. 1, the roughly rectangular body 5 of the printing apparatus has a printing head for printing data to be printed which is transmitted from electronic equipment such as an external host computer (not shown) via communication means such as a general-purpose interface 10, radio waves, infrared rays or the like, in a prescribed fashion such as a thermal, daisy wheel, ink-jet or wire dot system.

An operation panel section 6, which will be described below, is positioned on the top face of the main body 5 of the printing apparatus, and an inlet 7 for inserting a sheet is provided in the front face of the main body 5, and communicates with an outlet (not shown) for exhausting the sheet through a sheet feed path, in such a manner that a printing paper sheet is automatically fed toward the back of the main body upon its insertion in the direction indicated by the arrow A, during which process printing is performed by the printing head.

As is shown in FIG. 2 under magnification, the operation panel section 6 is provided with three selection keys 1–3, the number of which corresponds to that of the mode specifying marks listed on the mode selection menu sheet 8 which will be explained below. The respective selection keys have counterpart light emitting diode (LED) lamps 11–13; the LED lamps 11–13 are switched on/off upon pressing the selection keys 1–3.

The respective LED lamps 11–13 are used for displaying the set mode stored in the memory of the printing apparatus, as will be explained below. The ENTER key 4 is for entering the mode selected with the three selection keys 1–3; upon pressing the ENTER key 4 the set mode stored in the memory of the printing apparatus is updated, and simultaneously the mode selection menu sheet 8 travels a given distance in order that the mode options for the next setting item may be viewed by an operator.

FIG. 3 shows an embodiment of the mode selection menu sheet 8 which may be used for the printing apparatus according to the present invention, which serves to recognize the initialized modes when inserted into the inlet 7. The mode selection menu sheet 8 lists, sequentially in a sheet feeding direction, a plurality of mode options grouped under the setting items IT: font selection IT1, specific font IT2; reduction ratio IT3, sheet feed position IT4, character code list ITS, battery size IT6, CR (carriage return) code IT7, etc. The mode options grouped under the setting items include a plurality of modes C such as Ming and Gothic fonts.

Furthermore, the respective mode options are represented by corresponding mode specifying three-dot marks M which in turn correspond to the aforementioned selection keys 1–3 and LED lamps 11–13 in a one-to-one relationship.

Mode specifying marks "o" denotes that the selection keys 1–3 are in the OFF position and the LED lamps 11–13 are switched off, whereas mode specifying marks "●" denotes that the selection keys 1–3 are in the ON position and the LED lamps 11–13 are switched on.

For example, regarding the mode option "font selection", "●○○" represents Gothic font and reflects that only the selection key 1 is in the ON position.

FIG. 4 is a lock diagram which shows the overall printing apparatus 9 according to the present invention. In FIG. 4, a ROM 15 and a RAM 16 are linked to a CPU 17 to which two I/O ports 18, 19 are connected, and to the I/O port 18 are connected three selection keys 1–3, an ENTER key 4, and three LED lamps 11–13 corresponding to the selection keys 1–3 as well is a power switch 20 and a power LED 21. On the other hand, to the I/O port 19 are connected an EEPROM 22 into which the set modes are written, a sheet sensor 23, and a motor driver 25 which drives a sheet feeding motor 24. The CPU 17 controls a printing head driver 27 and a printing step onto a printing paper is conducted via a printing head 26.

The CPU 17 controls the ON/OFF of the LED lamps 11–13 on the basis of the information on the modes last established and stored in the EEPROM 22. More specifically, the CPU 17 identifies the setting item being presently displayed to an operator, for example, font selection, on the basis of the distance traveled by the mode selection menu sheet 8, and reads from the EEPROM 22 the information on the mode last selected from the mode options (modes), e.g., Gothic font selected from Gothic and Ming fonts, and switches on the LED lamp 11.

Accordingly, on the basis of the ON/OFF states of the LED lamps 11–13 and the mode specifying marks of the "font selection" item on the mode selection menu sheet the operator recognizes that the last established mode is Gothic font.

In addition, in the case where the selection keys 1–3 are operated to mitch, e.g., the Ming font specifying marks and the ENTER key 14 is pushed, the CPU 17 identifies the "Ming font" mode on the basis of the distance traveled by the mode selection menu sheet 8 and of whether the selection keys 1–3 are pushed, and stores the newly established mode in the RAM 16; in this way the last established mode is changed to the Ming font mode.

Upon pressing the ENTER key 4 to establish the new mode, the CPU 17 actuates the motor driver 25 to drive the sheet feeding motor 24 so that the mode selection menu sheet 8 is moved until he mode options for the next setting item, for instance, "specific font" listed on the mode selection menu sheet 8 may be viewed. The distances traveled by the mode selection men u sheet are prestored in the CPU 17.

The operation of the printing apparatus 9 according to the invention will now be explained with reference to the flow chart of FIG. 5 which shows how to set the printing and adjustment modes.

When the power switch 20 is turned on, first is it judged at step S1 whether the turn-on of the power switch 20 has been followed by the pressing of the ENTER key 4. The process skips to the printing mode of step S21 in the case where the ENTER key 4 has not been pushed, otherwise advancing to step S2 to read the presently established modes from the EEPROM 22 in the case where the ENTER key 4 has been pushed.

Next, at step S3 the sheet sensor 23 detects whether a sheet is present or not in the printing apparatus 9. The process immediately skips to step S5 in the case where no sheet is present, otherwise going to step S5 through step S4 of ejecting the sheet.

At step S5 which key of the keys 1–4 has been pushed is stored in the RAM 16 via the I/O port 18. At next step S6 it is judged whether a key has been operated. In the case where a key has been operated, it is judged at step S7 whether the key is the power switch 20. The process skips to step S22 in the case where the power switch 20 has been operated. In the case where no key has been operated, the process advances to step S8 to wait for insertion of the mode selection menu sheet 8. When the mode selection menu sheet 8 is inserted, the process advances to step S9 to feed the mode selection menu sheet until the part of the selection menu sheet 8 where the mode options for the first setting item are listed protrudes through the back side of the body 5 of the printing apparatus and reaches a position at which the contents of the protruded part are easily noticed by the operator. Then, at step S10 the current mode for the first setting item read from the EEPROM 22 is displayed by the LED lamps 11–13.

In this state, the current mode for the first setting item is ready to be changed into any other desired mode by the operation of the selection keys 1–3 according to the mode specifying marks "○" and "●" corresponding to the desired mode.

Next, at step S11, which key of the keys 1–4 has been pushed is stored in the RAM 16 via the I/O port 18.

Succeedingly, the process advances to step S11 to wait for the operation of a certain key. In the case where the certain key has been operated, the process advances to step S13, where it is judeged whether the power switch 20 has been operated at step S12. When it is judged that the power, switch has been operated, the process skips to step S20, where the mode selection menu sheet 8 is ejected, and thereafter skips to step S22, otherwise advancing to step S14.

At step S14 it is judged whether at least one of the keys 1–3 has been pushed at step S12. When at least one of the keys 1–3 has been pushed, the process advances to step S15, where the LED lamps 11–13 are turned on/off corresponding to the keys 1–3, and returns to aforementioned step S11. To the contrary, when any of the keys 1–3 has not been pushed, the process skips to step S16.

At step S16 it is judged whether the ENTER key 4 has been pushed at steep S12. When the ENTER key 4 has been pushed, the process advances to step S17, otherwise returning to step S11.

Next, at step S17 it is judged whether the operation at step S12 was for the final setting item of the mode selection menu sheet 8. When it was not for the final setting item, the process advances to step S18, and the mode selection menu sheet 8 is fed to the extent that the mode options for the next setting item may be viewed. Further, the process proceeds to step S19 to display the current mode of the setting item by the LED lamps 11–13, and then returns to aforementioned step S11. If the setting item is final, the process returns to aforementioned step S4.

If desired, t he newly established modes retained in the RAM 16 may be written into the EEPROM 22 at step S22 by operating the power switch 20 at step S12 after ejecting the mode selection menu sheet at step S20. Further, the process may be allowed to skip to step S22 by operating the power switch 20 at step S7 to write also the newly established modes retained in the RAM 16 into the EEPROM 22.

As the result, when the power switch 20 is subsequently turned on, the established modes are read from the EEPROM 22, and the printing apparatus 9 is activated according to the established modes to be ready for printing. When a printing paper sheet is inserted into the insertion port 7 of the printing apparatus 9 in this state, printing is carried out according to the aforementioned modes.

FIG. 6 and FIG. 7 are illustrations for a concrete explanation of an example of mode setting for a printing apparatus 9 according to the invention.

As an example, in the case of FIG. 6, the mode of the "font selection" item is Ming font which may be changed to Gothic font by pressing the selection key 1.

Here, in the case where a change from Ming font to Gothic font is necessary, the selection key 1 is pushed and then the ENTER key 4 is also pushed to effect the change to Gothic font, after which the mode selection menu sheet 8 may be fed by a sheet feeding motor 24 or feeding means to the extent that the mode options for the second setting item may be viewed. In the case where no change is necessary for the "font selection" item, pressing only the ENTER key 4 allows advancement to setting for the second setting item, as shown in FIG. 7. That is, pressing the ENTER key 4 results in writing of the updated mode into the RAM 16 and concurrent feeding of the mode selection menu sheet 8 to a position at which the mode options for the second setting item may be readily viewed by the operator, and the current mode for the second setting item is indicated by LED lamps 11–13 to be identified and, if desired, changed by the operator.

Here, since the distance traveled by the mode selection menu sheet 8 for each setting item is stored in the body 5 of the printing apparatus beforehand, the CPU 17 controls the motor driver 25 for the prescribed movement of the mode selection menu sheet 8.

The second and subsequent setting items may be easily established the same as in the first item by comparing the current mode indicated by the LED lamps 11–13 with the mode specifying marks represented on the mode selection menu sheet 8. In addition, immediately after setting a mode for each setting item preparations are made for identifying and changing the current mode for the next setting item. Furthermore, in the case of quite a few of setting items, two or more mode selection menu sheets 8 may be prepared for the mode options and a plurality of modes may be established by continuously conducting the aforementioned processing.

Here, the more options which may be listed on the mode selection menu sheet 8 are not limited to "font selection", "use of specific font", etc., and any other mode options may be included as well without any trouble so far as they are related to operating conditions for the printing apparatus.

The present embodiment has been explained with reference to a particular mode selection menu sheet 8 for printing mode. The present invention may definitely be applied to set adjustment modes including various factors such as selection of test characters used for adjusting the mechanism of the printing apparatus 9, setting a table of print density data for thermal or wire dot printing apparatuses, and correction of beams and adjustment of color balance for ink-jet printing apparatuses which are necessary for matching with environmental conditions such as barometric pressure.

When the modes are set, the menu sheet 8 is ejected, and the state prior to the start of setting the modes is restored. If desired, the updated modes may be stored by turning "OFF" the power switch 20, thereby concurrently writing the updated modes retained in the RAM 16 into the EEPROM 22.

When the power switch 20 is turned "ON" the next time, the updated modes are read from the EEPROM 22, and the printing apparatus 9 is activated according to the established modes and put into the printing mode. Accordingly, if a printing paper sheet is inserted into the insertion port 7, then printing is carried out according to thus established modes.

The printing apparatus 9 of the embodiment, which has the body 5 equipped with a row of the selection keys 1-3 and a row of the LED lamps 11-13, allows easy establishing the modes and provides a more compact control panel section 6 than conventional control panel sections provided with many selection keys for many mode options.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed:

1. A printing apparatus comprising:

a mode selection menu sheet to be referred to in setting at least one desired mode of operation, on which sheet are successively listed, in the direction of feeding of said sheet into said apparatus, a plurality of groups including a setting item, mode options and a plurality of marks for specifying a mode option;

sheet feeding means for feeding the mode selection menu sheet in such a manner which allows successive viewing of the plurality of setting item groups listed on the sheet;

selection keys provided to match the number of the marks for specifying a mode option;

lamp means, corresponding to the selection keys;

display control means for indicating an established mode for each setting item for the printing apparatus with the ON/OFF state of the lamp mean, sequentially as the mode selection menu sheet proceeds; and mode-setting means for changing the ON/OFF state by operation of the selection keys to change the established mode for the printing apparatus in response to the operation of changing the ON/OFF state, wherein the selection keys are operable with reference to the mode specifying marks listed on the mode selection menu sheet to set desired modes of the respective setting items.

2. A printing apparatus comprising:

a mode selection menu sheet, to be referred to in setting at least one desired mode of operation, on which sheet are successively listed, in the direction of feeding of said sheet into said apparatus, a plurality of groups including a setting item, mode options and a plurality of marks for specifying a mode option;

sheet feeding means for feeding the mode selection menu sheet in such a manner which allows successive viewing of the plurality of setting item groups listed on the sheet;

selection keys provided to match the number of the marks for specifying a mode option;

lamp means corresponding to the selection keys;

display control means for indicating an established mode for each setting item for the printing apparatus with the ON/OFF state of the lamp means, sequentially as the mode selection menu sheet proceeds; and mode-setting means for changing the ON/OFF state by operation of the selection keys to change the established mode for the printing apparatus in response to the operation of changing the ON/OFF state, wherein the selection keys are operable with reference to the mode specifying marks listed on the mode selection menu sheet to set desired modes of the respective setting items, wherein the mode setting means comprises an ENTER key for entering the mode selected by the selection keys, and means for recognizing the mode established by the operation of the ENTER key, on the basis of the distance traveled by the mode selection menu sheet and the states of the selection keys, and the sheet-feeling means comprises feeding means for feeding the mode selection menu sheet by one group including a setting item, mode options and a plurality of marks for specifying a mode option each time the ENTER key is operated.

3. The printing apparatus of claim 2, wherein the printing apparatus further comprises a power switch for supplying/interrupting a source voltage, and in a configuration in which the source voltage is supplied by actuation of only the power switch, the printing apparatus is put into a print mode, and in a configuration in which the source voltage is supplied by actuation of the power switch together with actuation of the ENTER key, the printing apparatus is put into a state capable of setting a mode with reference to the mode selection menu sheet.

* * * * *